United States Patent
Dinu et al.

(10) Patent No.: US 7,283,744 B2
(45) Date of Patent: Oct. 16, 2007

(54) PERFORMANCE MONITORING BASED ON OPTICAL AUTOCORRELATION

(75) Inventors: Mihaela Dinu, Freehold, NJ (US);
Daniel C. Kilper, Fair Haven, NJ (US);
Howard R. Stuart, East Windsor, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 556 days.

(21) Appl. No.: 10/838,059

(22) Filed: May 3, 2004

(65) Prior Publication Data

US 2005/0244154 A1  Nov. 3, 2005

(51) Int. Cl.
*H04B 10/08* (2006.01)
*H04B 10/12* (2006.01)
*H04B 10/00* (2006.01)
*H04J 14/02* (2006.01)

(52) U.S. Cl. ............................ 398/33; 398/26; 398/27; 398/81; 398/147; 398/158

(58) Field of Classification Search ................ 398/9, 398/25–27, 33, 81, 147, 158, 159, 161
See application file for complete search history.

(56) References Cited

U.S. PATENT DOCUMENTS

| | | | |
|---|---|---|---|
| 4,198,634 A | 4/1980 | Jernigan et al. | 343/100 CL |
| 5,513,029 A * | 4/1996 | Roberts | 398/32 |
| 5,651,030 A | 7/1997 | Wong et al. | 375/316 |
| 5,760,732 A | 6/1998 | Marmarelis et al. | 342/145 |
| 5,828,679 A | 10/1998 | Fisher | 372/6 |
| 6,178,025 B1 * | 1/2001 | Hardcastle et al. | 398/17 |
| 6,204,926 B1 | 3/2001 | Maznev et al. | 356/521 |
| 6,310,703 B1 | 10/2001 | Alavie et al. | 359/110 |
| 6,344,910 B1 | 2/2002 | Cao | 359/110 |
| 6,952,306 B1 * | 10/2005 | Anderson | 359/298 |
| 7,024,111 B2 * | 4/2006 | Knox et al. | 398/25 |
| 2004/0213338 A1 * | 10/2004 | Strawczynski et al. | 375/224 |
| 2005/0135529 A1 * | 6/2005 | Upton et al. | 375/367 |

* cited by examiner

*Primary Examiner*—Dalzid Singh

(57) ABSTRACT

An optical performance monitor (OPM) adapted to (i) sample an autocorrelation function corresponding to an optical signal transmitted in an optical network and (ii) based on the sampling, characterize two or more impairments concurrently present in the optical signal. In one embodiment, the OPM has an optical autocorrelator (OAC) coupled to a signal processor (SP). The OAC receives the optical signal from the network, generates two or more samples of its autocorrelation function, and applies said samples to the SP. The SP processes the samples and generates two or more signal metrics. Based on the signal metrics and reference data corresponding to the impairments, the SP then obtains a measure of each of the impairments.

21 Claims, 6 Drawing Sheets
(1 of 6 Drawing Sheet(s) Filed in Color)

PERFORMANCE MONITORING BASED ON OPTICAL AUTOCORRELATION

CROSS-REFERENCE TO RELATED APPLICATIONS

The subject matter of this application is related to that of U.S. patent application Ser. No. 10/109,623, filed Mar. 28, 2002, and entitled "Performance Monitoring in an Optical Communication System," the teachings of which are incorporated herein by reference.

BACKGROUND OF THE INVENTION

1. Field of the Invention

The present invention relates to optical communication systems and, more specifically, to monitoring the performance of such systems.

2. Description of the Related Art

Fiber optic networks are widely used for data transmission in modern communication systems. Due to increasing data traffic volumes, monitoring and management of networks become increasingly important. For example, such monitoring may include a measurement at a particular point in the network of the quality of an optical signal corresponding to one or more optical communication channels. The optical signal may be analyzed for various impairments, e.g., optical signal-to-noise ratio (OSNR), timing jitter, chromatic dispersion, and the like. Obtained information may then be used to improve the performance of the network, for example, if certain impairments exceed a tolerable level.

One known method of analyzing an optical signal is to tap that signal, convert it into an electrical signal using an optical-to-electrical (O/E) converter, and then analyze the electrical signal for impairments using electrical signal-processing methods. However, one disadvantage of this method is that it typically requires high-speed electronics. Optical methods applied to optical performance monitoring have certain advantages over purely electrical methods because at least part of the signal processing is accomplished in the optical domain, which reduces bandwidth requirements to the monitoring electronics. While nonlinear optical techniques are particularly suitable for optical performance monitoring, practical applications of such techniques to optical performance monitoring are not yet sufficiently developed.

SUMMARY OF THE INVENTION

Problems in the prior art are addressed, in accordance with the principles of the present invention, by an optical performance monitor (OPM) adapted to (i) sample an autocorrelation function corresponding to an optical signal transmitted in an optical network and (ii) based on the sampling, characterize two or more impairments concurrently present in the optical signal. In one embodiment, the OPM has an optical autocorrelator (OAC) coupled to a signal processor (SP). The OAC receives the optical signal from the network, generates two or more samples of its autocorrelation function, and applies said samples to the SP. The SP processes the samples and generates two or more signal metrics. Based on the signal metrics and reference data corresponding to the impairments, the SP then obtains a measure of each of the impairments. For example, when two concurrently present impairments are optical noise and chromatic dispersion, the reference data provide two three-dimensional reference surfaces, each surface representing the corresponding impairment as a function of the signal metrics. A current value of each impairment is determined from the point on the corresponding reference surface having the current values of the signal metrics as coordinates. Advantageously, both an optical signal-to-noise ratio (OSNR) value and a value of chromatic dispersion can unambiguously be assigned to the optical signal based on the autocorrelation and reference data. An OPM of the invention may be used to observe and/or adjust the performance of a communication link.

According to one embodiment, the present invention is an apparatus for performance monitoring in a communication system, the apparatus comprising: (a) an OAC adapted to receive an optical signal from the communication system and to generate two or more samples of an autocorrelation function corresponding to the optical signal; and (b) an SP coupled to the OAC and adapted to characterize two or more impairments concurrently present in the optical signal based on the two or more samples.

According to another embodiment, the present invention is a method for monitoring performance in a communication system, the method comprising: (A) generating two or more samples of an optical autocorrelation function corresponding to an optical signal of the communication system; and (B) characterizing two or more impairments concurrently present in the optical signal based on the two or more samples.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
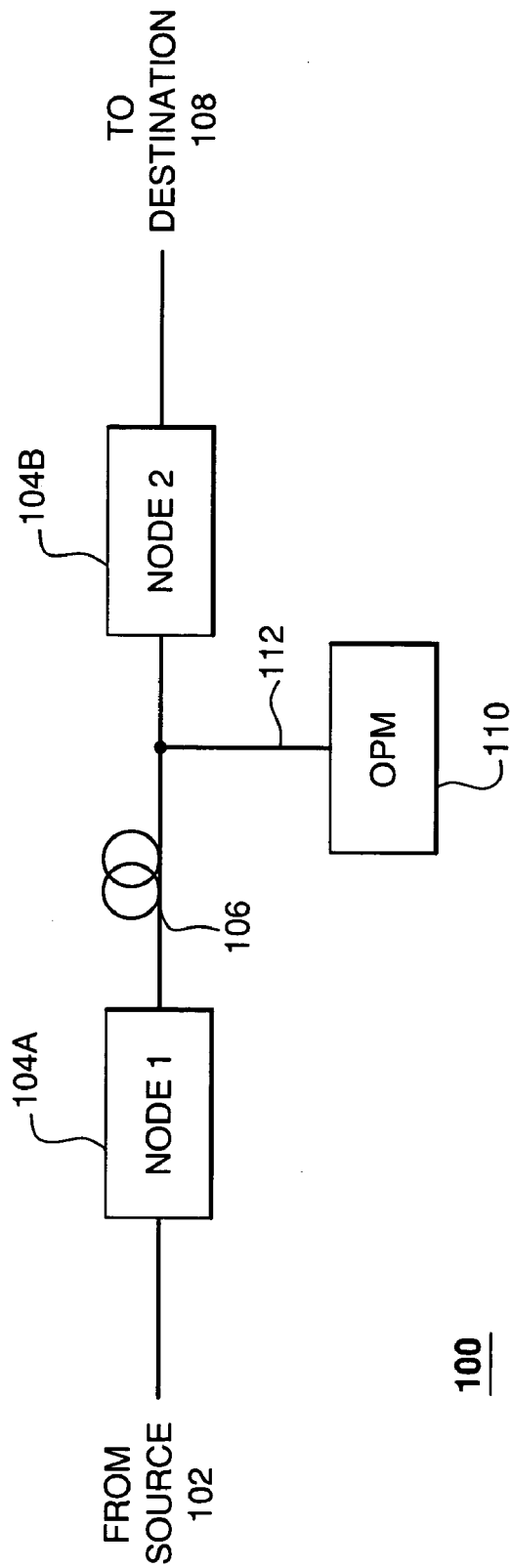
FIG. 1 shows a block diagram of a fiber optic network utilizing an optical performance monitor (OPM) according to one embodiment of the present invention.

FIG. 1 illustrates a fiber optic network 100, which utilizes an optical performance monitor (OPM) 110 according to one embodiment of the present invention. Network 100 is configured to carry optical signals modulated with data from a source node 102 to a destination node 108 via a plurality of intermediate nodes 104. A long-haul, metro, or access optical transmission link, such as link 106, may connect a pair of nodes, such as intermediate nodes 104A and 104B shown in FIG. 1. Link 106 may include optical amplifiers (not shown) configured to boost the optical signals, e.g., attenuated by light absorption in the optical fiber. One or more optical performance monitors, such as OPM 110, may be located at one or more different points along network 100 to monitor the quality of optical signals at those points. In FIG. 1, OPM 110 is illustrated as being connected to link 106 between nodes 104A and 104B and receiving from the link a tap signal 112.

Figure 2:
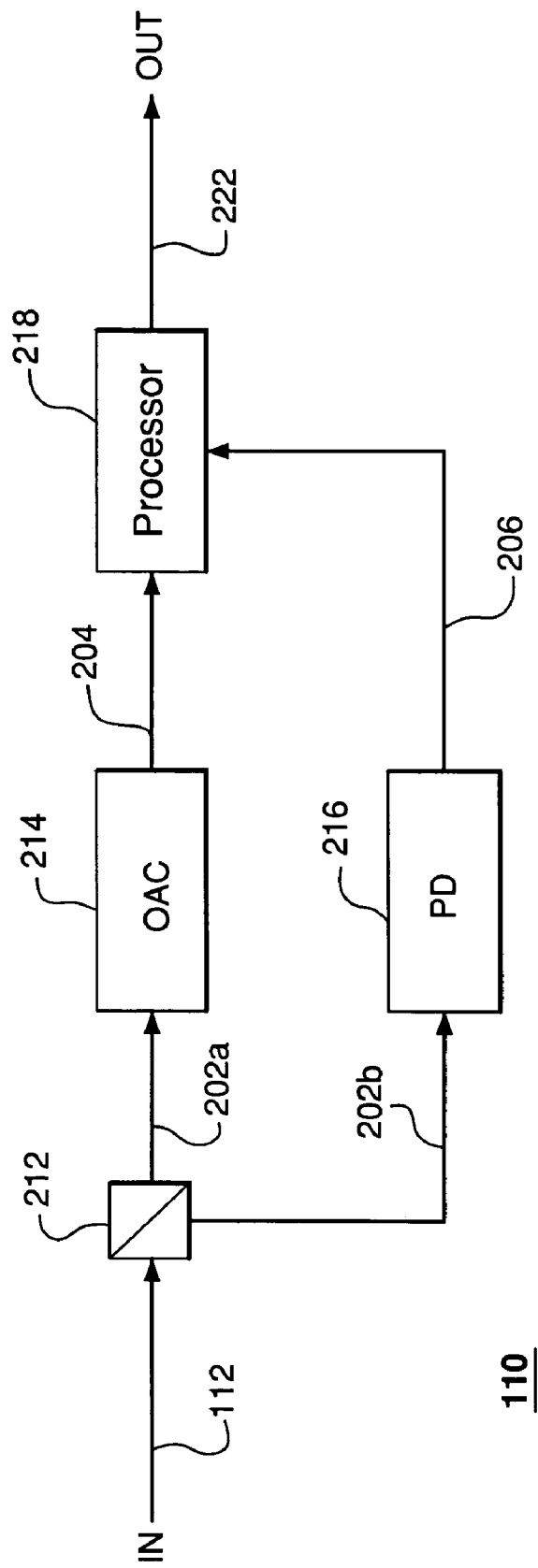
FIG. 2 shows a block diagram of an OPM that may be used in the fiber optic network of FIG. 1 according to one embodiment of the present invention.

FIG. 2 shows OPM 110 according to one embodiment of the present invention. OPM 110 has an optical autocorrelator (OAC) 214 and an optional power detector (PD) 216, both coupled to a signal processor (SP) 218. A splitter 212 splits tap signal 112 into two optical signals 202a-b applied to OAC 214 and PD 216, respectively. In a preferred implementation, the most (in terms of signal intensity) of signal 212 (e.g., about 99%) is directed to OAC 214, while only a small fraction (e.g., about 1%) is directed to PD 216. OAC 214 is adapted to measure an optical autocorrelation function of signal 202.

In general, an autocorrelation function, A, of a time-dependent function, S(t), may be expressed by Eq. (1), as follows:

$$A(t', t_0, \tau) = \int_{-t'/2}^{t'/2} S(t_0 + t)S(t_0 + t + \tau)dt \quad (1)$$

i.e., A is obtained by multiplying S(t) by its copy delayed by a time interval ($\tau$, delay period) and integrating the result over a time interval having a width of t' and centered around time $t_0$. When S(t) is an ergodic or periodic function and the integration interval t' is relatively large, $A(t', t_0, \tau)$ becomes a function of $\tau$ only. Therefore, in fiber optic network 100 adapted to transmit pseudo-random bit sequences, signal 112 is a pseudo-random signal having an autocorrelation function depending on $\tau$ only, i.e., $A(\tau)$.

In OAC 214, $A(\tau)$ is sampled using a set of delay periods. For example, in one embodiment, OAC 214 is configured to sample the autocorrelation function of signal 202a in N points, where N≧1. OAC 214 then generates an electrical signal 204 corresponding to the N sampled points and applies it to signal processor 218 for further processing. PD 216 is a photo-detector adapted to generate an electrical signal 206 proportional to the average optical power of signal 202b, which is also applied to signal processor 218. Signal processor 218 processes the received signals to detect impairments in signal 112 and generates a corresponding output signal 222 that may be used, e.g., to observe and/or adjust the performance of link 106 (FIG. 1).

Figure 3:
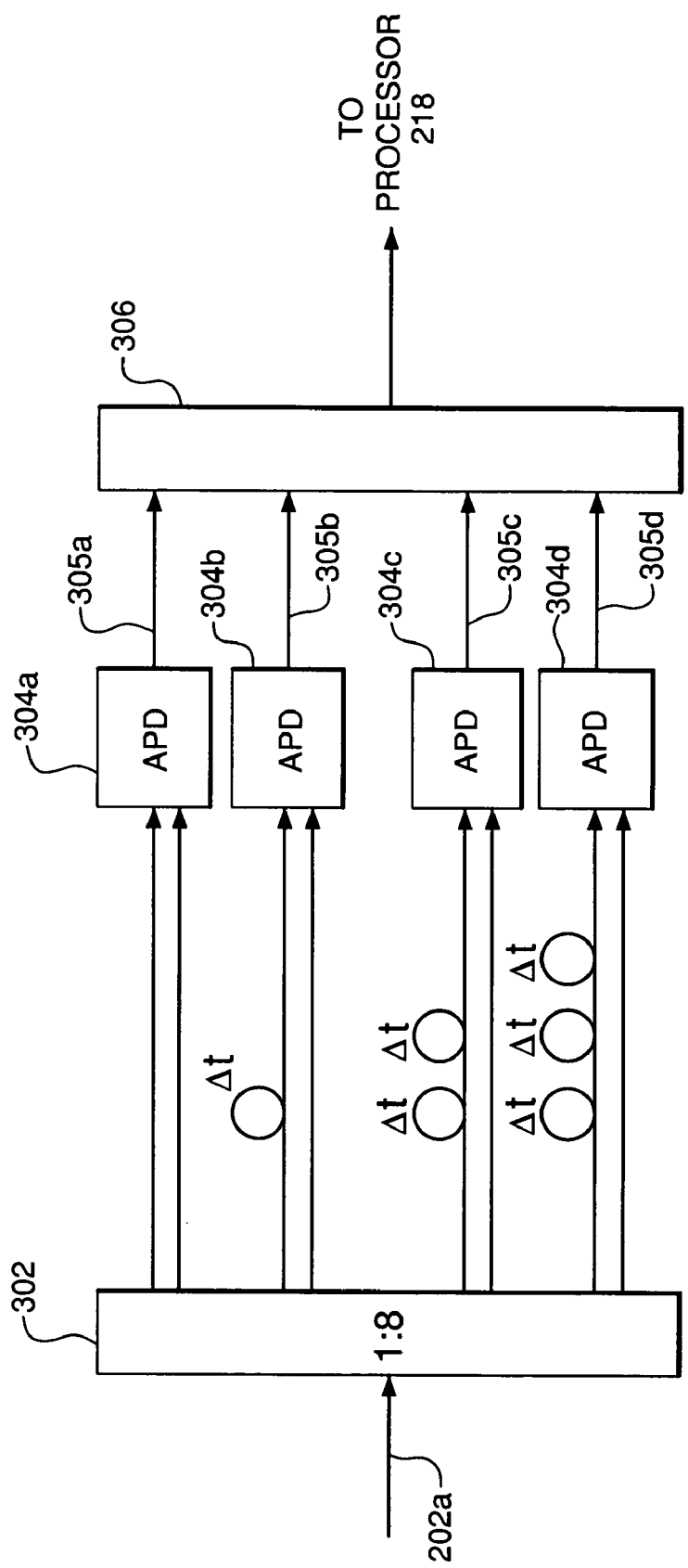
FIG. 3 shows a block diagram of an optical autocorrelator that may be used in the OPM of FIG. 2 according to one embodiment of the present invention.

FIG. 3 shows an OAC 314 that can be used as OAC 214 of FIG. 2 according to one embodiment of the present invention. OAC 314 has a 1:8 signal splitter 302, four avalanche photodiodes (APDs) 304a-d, and an output interface 306. Splitter 302 divides an optical signal (e.g., 202a of FIG. 2) applied to OAC 314 into eight copies, three of which are delayed with respect to the remaining copies by one half, one, and one-and-a-half bit periods, respectively, as indicated in FIG. 3 by the corresponding delay elements $\Delta t$. Each of APDs 304a-d receives two copies (which are coherently combined either directly at the APD or in front of the APD), with APD 304a receiving two non-delayed copies and each of APDs 304b-d receiving one delayed copy and one non-delayed copy. Each of APDs 304a-d is a device designed to detect optical signals through two-photon absorption. As such, it generates an electrical signal 305 corresponding to a product of the two optical signals applied to the APD. Therefore, APDs 304a-d generate samples of the autocorrelation function $A(\tau)$ (see Eq. (1)) at $\tau$=0, $0.5T_0$, $T_0$, and $1.5T_0$, respectively, where $T_0$ is a bit period. The samples are then output from OAC 314 via output interface 306, e.g., to signal processor 218 (FIG. 2). In one embodiment, to reduce the polarization dependence of two-photon absorption in the nonlinear medium of APD 304, the APD incorporates or is coupled to one or more optical elements adapted to introduce polarization diversity or polarization scrambling. One skilled in the art will understand that other known techniques such as optical chopping, phase averaging, and fringe averaging can also be utilized without departing from the scope and principles of the invention. Additional details on alternative embodiments of OAC 214 can be found in the above-cited U.S. patent application Ser. No. 10/109,623.

Figure 4A:
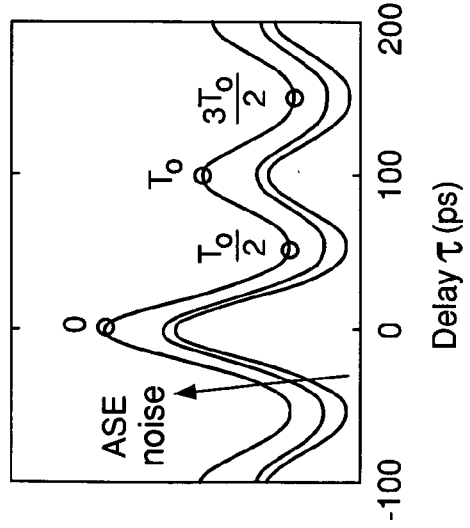
FIGS. 4A-C graphically illustrate the effects of noise, chromatic dispersion, and timing jitter, respectively, on the autocorrelation function of an optical signal, when the signal is substantially free of all other impairments except for the one impairment indicated in the corresponding figure.
Figure 4B:
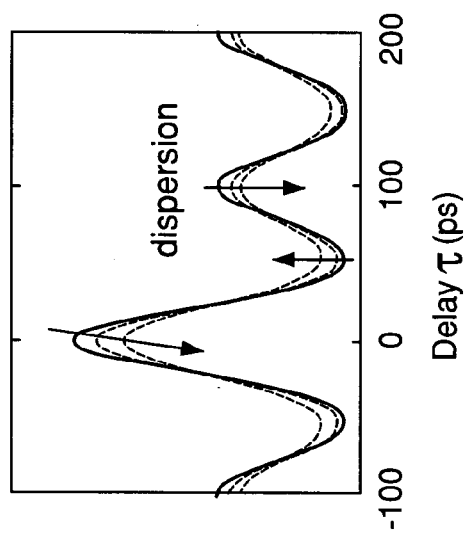
Figure 4C:
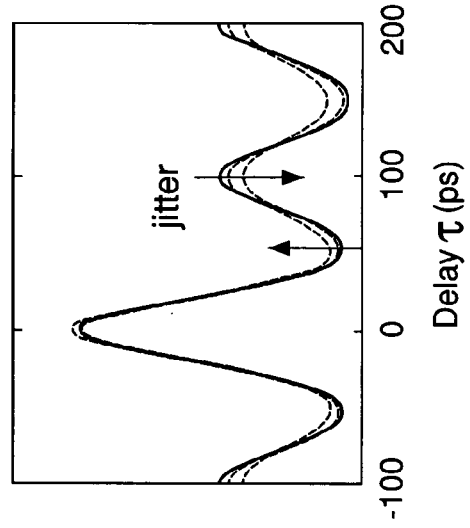

FIGS. 4A-C graphically illustrate the effects of amplified spontaneous emission (ASE) noise, chromatic dispersion, and timing jitter, respectively, on the autocorrelation function of a 10-Gb/s (i.e., $T_0$=100 ps) return-to-zero (RZ) optical signal having Gaussian optical pulses with full width at half-maximum of about 33 ps. More specifically, each of FIGS. 4A-C illustrates a situation, in which the optical signal is substantially free of all other impairments except for the one indicated in the figure. The arrows in each of FIGS. 4A-C indicate an increase in the amplitude of the corresponding impairment. The three autocorrelation functions shown in FIG. 4A represent signals having increasing ASE noise levels, which result in decreasing OSNR values. FIG. 4B illustrates changes in the autocorrelation function corresponding to dispersion changes from about 0 to 200 ps/nm, and FIG. 4C illustrates changes in the autocorrelation function corresponding to a change in jitter from about 0 to 20 ps. As seen in FIGS. 4A-C, samples of the autocorrelation function generated by OAC 314 are sensitive to and therefore can be used to monitor noise, chromatic dispersion, and timing jitter.

The above-cited U.S. patent application Ser. No. 10/109,623 provides further details on an autocorrelation method of monitoring various signal impairments, e.g., chromatic dispersion, timing jitter, etc., which method is relatively efficient when substantially one of those impairments is present. However, as further explained below, the method might be relatively inefficient when two or more signal impairments are present concurrently. As such, an improved method of optical performance monitoring is needed, using which a network operator can quantify the contribution of each impairment into the overall signal degradation.

Figure 5:
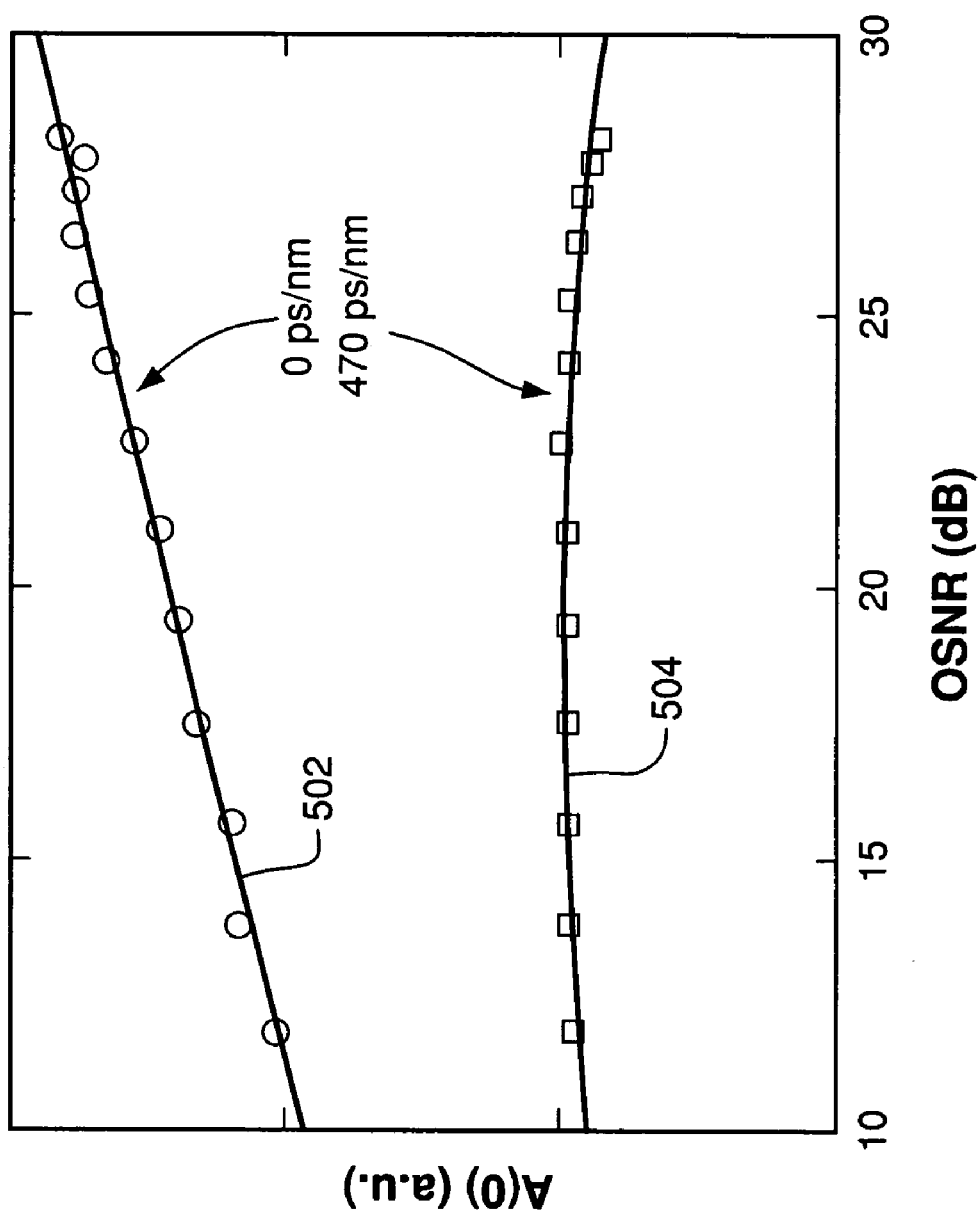
FIG. 5 graphically illustrates the effect of noise and dispersion on the zero delay point of the autocorrelation function of the optical signal illustrated in FIG. 4, when both of these impairments are present concurrently.

FIG. 5 graphically illustrates the effect of noise and dispersion on the autocorrelation function of the optical signal illustrated in FIG. 4 when both of these signal impairments are present concurrently. More specifically, curves 502 and 504 show $A(\tau=0)$, hereafter denoted as $A(0)$, as a function of OSNR at dispersion values of about 0 and 470 ps/nm, respectively. In agreement with FIG. 4A, curve 502 shows that, in the absence of dispersion, the value of A(0) increases with the increasing noise level. However, curve 504 indicates that, in the presence of dispersion, the value of A(0) becomes substantially insensitive to noise increases. This behavior can be understood by combining the data shown in FIGS. 4A-B. While the value of A(0) increases due to the effect of noise (FIG. 4A), this increase is substantially offset by a decrease in the value of A(0) due to the effect of dispersion (FIG. 4B). Consequently, in the situation illustrated by curve 504, it becomes very difficult to obtain OSNR from A(0).

In general, a problem similar to that indicated by curve 504 for A(0) is also encountered for other samples of A(t), generated by OAC 314 when two or more impairments are concurrently present. The following description addresses this problem by providing a method for processing samples of the autocorrelation function corresponding to an optical signal having two or more concurrently present signal impairments. As will be appreciated by one skilled in the art, various embodiments of the invention enable measurements of various concurrently present impairments.

Suppose that two impairments concurrently present in an optical signal are noise and chromatic dispersion. Then, according to one embodiment of the invention, the following processing method can be applied to obtain the corresponding OSNR and dispersion values from the samples generated by OAC 314. First, the values of $A(\tau=0.5T_0)$, $A(\tau=T_0)$, and $A(\tau=0.5T_0)$ are normalized by the value of A (0) to obtain a corresponding normalized set of parameters $i_{0.5}$, $i_1$, and $i_{1.5}$. The normalized parameters are then used to generate two signal metrics $b_{ave}$ and $b_h$ given by Eq. (2) as follows:

$$b_{ave} = \frac{1}{2}\left(i_1 + \frac{1}{2}(i_{0.5} + i_{1.5})\right) \quad (2a)$$

$$b_h = i_1 - \frac{1}{2}(i_{0.5} + i_{1.5}) \quad (2b)$$

In a three-dimensional Cartesian space, two dimensions of which are two orthogonal axes corresponding to metrics $b_{ave}$ and $b_h$, respectively, and a third dimension is an axis corresponding to the impairment itself, the impairment is represented by a three-dimensional (i.e., curved) surface. This surface is unique for each type of modulation, e.g., RZ, NRZ (non-return-to-zero), DPSK (differential phase-shift keying), etc., and carrier signal characteristics (e.g., duty cycle, pulse shape, etc.) and can be obtained, e.g., through calibration or computer simulation, for each particular type of signal to be monitored with OPM 110 (FIGS. 1-2). Data representing the surface are stored in signal processor 218 (FIG. 2) in a reference database. For example, to enable processor 218 to analyze noise and dispersion, the reference database has data corresponding to two reference surfaces, each in the corresponding three-dimensional space, one surface representing the OSNR and the other representing dispersion. Processor 218 then obtains current values of the OSNR and dispersion by finding points on these two reference surfaces having as coordinates the current values of $b_{ave}$ and $b_h$. Computer simulations show that, for dispersion values below about 650 ps/nm and OSNR values below about 30 dB, a one-to-one correspondence can be established between each pair of $b_{ave}$ and $b_h$ and the values of dispersion and OSNR. Advantageously, unlike the situation illustrated by curve 504 (FIG. 5), the corresponding values of OSNR and dispersion are unambiguously assigned to the optical signal based on the autocorrelation data and reference surfaces.

Figure 6A:
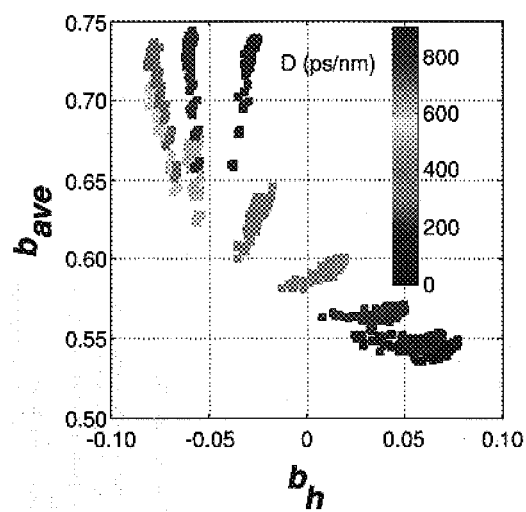
FIGS. 6A-B graphically show representative data that can be used in the OPM of FIG. 2 to obtain reference surfaces corresponding to chromatic dispersion and noise, respectively.
Figure 6B:
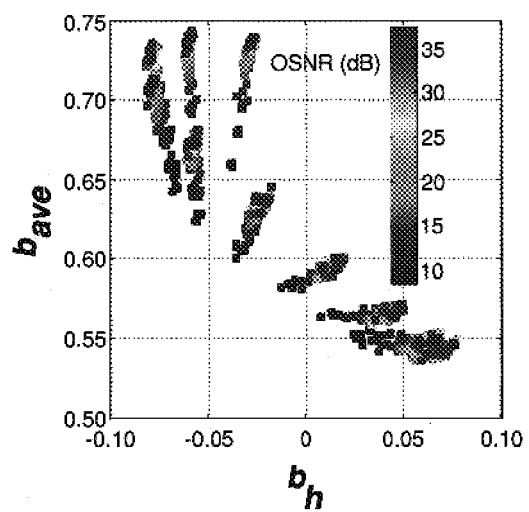

FIGS. 6A-B graphically show representative data that can be used in processor 218 to obtain reference surfaces corresponding to chromatic dispersion and noise, respectively. More specifically, the data shown in FIGS. 6A-B are obtained using computer simulation and correspond to the optical signal illustrated in FIG. 4. As appreciated by one skilled in the art, the data points of FIG. 6 represent discrete samples of the reference surfaces. Signal processor 218 is adapted to construct a continuous reference surface as known in the art, e.g., by filling gaps in the data using a suitable data interpolation/extrapolation algorithm. Experimental evaluation of the data shown in FIG. 6 indicated that the simulation was in good agreement with the actual system behavior.

While this invention has been described with reference to illustrative embodiments, this description is not intended to be construed in a limiting sense. In general, a set of three normalized parameters (e.g., $i_{0.5}$, $i_1$, and $i_{1.5}$) can provide three independent metrics of the autocorrelation function. These three metrics can then be used to evaluate three different signal impairments or provide redundancy in the evaluation of two signal impairments. One skilled in the art will appreciate that a greater number of independent metrics can be used to evaluate a corresponding greater number of signal impairments. Alternatively or in addition, a greater number of independent metrics can be used to provide greater redundancy. The normalized parameters can be appropriately manipulated to generate different suitable metrics. Examples of additional parameters that can be used for the generation of such metrics can be found in the above-cited U.S. patent application Ser. No. 10/109,623. Such manipulation may be based on functions different from the linear combinations given in Eq. (2). Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

What is claimed is:

1. Apparatus for performance monitoring in a communication system, the apparatus comprising:
   (a) an optical autocorrelator (OAC) adapted to receive an optical signal from the communication system and to generate two or more samples of an autocorrelation function corresponding to the optical signal; and
   (b) a signal processor (SP) coupled to the OAC and adapted to (i) characterize two or more impairments concurrently present in the optical signal based on the two or more samples, (ii) generate two or more signal metrics based on the two or more samples, and (iii) obtain values corresponding to the two or more impairments based on the two or more signal metrics and reference data corresponding to said impairments.

2. The invention of claim 1, wherein the SP is further adapted to generate a feedback signal for the communication system based on the two or more impairments and the feedback signal is applied to the communication system to improve performance.

3. The invention of claim 1, wherein the two or more impairments include at least one of dispersion, noise, and timing jitter.

4. The invention of claim 1, wherein the reference data are obtained via computer simulation.

5. The invention of claim 1, wherein the two or more samples comprise (i) a first sample corresponding to a substantially zero relative delay, (ii) a second sample corresponding to a relative delay of substantially one half bit period, (iii) a third sample corresponding to a relative delay of substantially one bit period, and (iv) a fourth sample corresponding to a relative delay of substantially one-and-a-half bit periods.

6. The invention of claim 5, wherein: the two or more impairments are noise and dispersion; and the two or more signal metrics include metrics $b_{ave}$ and $b_h$ defined as follows:

$$b_{ave} = \frac{1}{2}\left(i_1 + \frac{1}{2}(i_{0.5} + i_{1.5})\right)$$

$$b_h = i_1 - \frac{1}{2}(i_{0.5} + i_{1.5})$$

where $i_{0.5}$ is the second sample divided by the first sample; $i_1$ is the third sample divided by the first sample; and $i_{1.5}$ is the fourth sample divided by the first sample.

7. The invention of claim 6, wherein the reference data represent two reference surfaces, one surface providing values of noise as a function of the metrics $b_{ave}$ and $b_h$ and the other surface providing values of dispersion as a function of the metrics $b_{ave}$ and $b_h$.

8. The invention of claim 1, wherein the OAC comprises:
   a splitter adapted to direct four or more signal copies corresponding to the optical signal via four or more optical paths, wherein at least one of the optical paths is characterized by a time delay with respect to at least one other optical path; and
   two or more detectors, each adapted to generate an electrical signal based on a superposition and mixing of two signal copies, wherein the samples are based on said electrical signals.

9. The invention of claim 8, wherein the splitter is adapted to direct eight signal copies corresponding to the optical signal via eight optical paths, wherein:
   first, second, fourth, sixths and eighth optical paths have a first time delay;
   a third optical path has a delay greater than the first delay by substantially one half bit period;
   a fifth optical path has a delay greater than the first delay by substantially one bit period; and
   a seventh optical path has a delay greater than the first delay by substantially one-and-a-half bit periods.

10. The invention of claim 9, wherein the two or more detectors comprise:
    a first detector adapted to generate a first sample based on the copies received via the first and second optical paths;
    a second detector adapted to generate a second sample based on the copies received via the third and fourth optical paths;
    a third detector adapted to generate a third sample based on the copies received via the fifth and sixth optical paths; and
    a fourth detector adapted to generate a fourth sample based the copies received via the seventh and eighth optical paths.

11. A method for monitoring performance in a communication system, the method comprising:
    (A) generating two or more samples of an optical autocorrelation function corresponding to an optical signal of the communication system;
    (B) characterizing two or more impairments concurrently present in the optical signal based on the two or more samples;
    (C) generating two or more signal metrics based on the two or more samples; and
    (D) obtaining values corresponding to the two or more impairments based on the two or more signal metrics and reference data corresponding to said impairments.

12. The invention of claim 11, further comprising:
    generating a feedback signal for the communication system based on the two or more impairments; and
    applying the feedback signal to the communication system to improve performance.

13. The invention of claim 10, wherein the two or more impairments include at least one of dispersion, noise, and timing jitter.

14. The invention of claim 12, wherein the reference data are obtained via computer simulation.

15. The invention of claim 12, wherein the two or more samples comprise (i) a first sample corresponding to a substantially zero relative delay, (ii) a second sample corresponding to a relative delay of substantially one half bit period, (iii) a third sample corresponding to a relative delay of substantially one bit period, and (iv) a fourth sample corresponding to a relative delay of substantially one-and-a-half bit periods.

16. The invention of claim 10, wherein:
    the two or more impairments are noise and dispersion; and
    the two or more signal metrics include metrics $b_{ave}$ and $b_h$ defined as follows:

$$b_{ave} = \frac{1}{2}\left(i_1 + \frac{1}{2}(i_{0.5} + i_{1.5})\right)$$

$$b_h = i_1 - \frac{1}{2}(i_{0.5} + i_{1.5})$$

where $i_{0.5}$ is the second sample divided by the first sample; $i_1$ is the third sample divided by the first sample; and $i_{1.5}$ is the fourth sample divided by the first sample.

17. The invention of claim 16, wherein the reference data represent two reference surfaces, one surface providing values of noise as a function of the metrics $b_{ave}$ and $b_h$ and the other surface providing values of dispersion as a function of the metrics $b_{ave}$ and $b_h$.

18. Apparatus for performance monitoring in a communication system, the apparatus comprising:
(A) means for generating two or more samples of an optical autocorrelation function corresponding to an optical signal of the communication system;
(B) means for characterizing two or more impairments concurrently present in the optical signal based on the two or more samples;
(C) means for generating two or more signal metrics based on the two or more samples; and
(D) means for obtaining values corresponding to the two or more impairments based on the two or more signal metrics and reference data corresponding to said impairments.

19. Apparatus for performance monitoring in a communication system, the apparatus comprising:
(a) an optical autocorrelator (OAC) adapted to receive an optical signal from the communication system and to generate two or more samples of an autocorrelation function corresponding to the optical signal; and
(b) a signal processor (SP) coupled to the OAC and adapted to characterize two or more impairments concurrently present in the optical signal based on the two or more samples, wherein the OAC comprises:
a splitter adapted to direct four or more signal copies corresponding to the optical signal via four or more optical paths, wherein at least one of the optical paths is characterized by a time delay with respect to at least one other optical path; and
two or more detectors, each adapted to generate an electrical signal based on a superposition and mixing of two signal copies, wherein the samples are based on said electrical signals.

20. The invention of claim 19, wherein the splitter is adapted to direct eight signal copies corresponding to the optical signal via eight optical paths, wherein:
first, second, fourth, sixths and eighth optical paths have a first time delay;
a third optical path has a delay greater than the first delay by substantially one half bit period;
a fifth optical path has a delay greater than the first delay by substantially one bit period; and
a seventh optical path has a delay greater than the first delay by substantially one-and-a-half bit periods.

21. The invention of claim 20, wherein the two or more detectors comprise:
a first detector adapted to generate a first sample based on the copies received via the first and second optical paths;
a second detector adapted to generate a second sample based on the copies received via the third and fourth optical paths;
a third detector adapted to generate a third sample based on the copies received via the fifth and sixth optical paths; and
a fourth detector adapted to generate a fourth sample based the copies received via the seventh and eighth optical paths.

* * * * *